(12) United States Patent
Draeger

(10) Patent No.: US 12,140,429 B2
(45) Date of Patent: Nov. 12, 2024

(54) LASER LEVEL

(71) Applicant: Milwaukee Electric Tool Corporation, Brookfield, WI (US)

(72) Inventor: David W. Draeger, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 430 days.

(21) Appl. No.: 17/688,441

(22) Filed: Mar. 7, 2022

(65) Prior Publication Data

US 2022/0268581 A1      Aug. 25, 2022

Related U.S. Application Data

(63) Continuation of application No. PCT/US2022/017151, filed on Feb. 21, 2022.

(60) Provisional application No. 63/171,211, filed on Apr. 6, 2021, provisional application No. 63/152,073, filed on Feb. 22, 2021.

(51) Int. Cl.
*G01C 15/12* (2006.01)
*G01C 15/00* (2006.01)

(52) U.S. Cl.
CPC ........... *G01C 15/12* (2013.01); *G01C 15/006* (2013.01)

(58) Field of Classification Search
CPC .............................. G01C 15/004; G01C 15/12
USPC ......................................................... 33/290
See application file for complete search history.

(56) References Cited

U.S. PATENT DOCUMENTS

| | | |
|---|---|---|
| 4,035,084 A | 7/1977 | Ramsay |
| 4,519,705 A | 5/1985 | Morrow |
| 5,782,003 A | 7/1998 | Bozzo |
| D416,856 S * | 11/1999 | Onose ................. G01C 15/004 D13/101 |
| 6,014,211 A * | 1/2000 | Middleton ........... G01C 15/004 356/250 |
| 6,643,004 B2 | 11/2003 | Detweiler et al. |
| 6,754,969 B2 | 6/2004 | Waibel |
| 6,870,608 B2 | 3/2005 | Detweiler et al. |
| 6,941,665 B1 | 9/2005 | Budrow et al. |
| 7,064,819 B2 | 6/2006 | Detweiler et al. |
| 7,237,341 B2 | 7/2007 | Murray |
| 7,266,897 B2 | 9/2007 | Treichler et al. |
| 7,441,340 B2 | 10/2008 | Hertzman |

(Continued)

FOREIGN PATENT DOCUMENTS

| | | |
|---|---|---|
| CN | 202013193 | 10/2011 |
| CN | 111256667 | 6/2020 |

(Continued)

OTHER PUBLICATIONS

International Search Report and Written Opinion for International Application No. PCT/US2022/017151, dated May 31, 2022, 10 pages.

*Primary Examiner* — George B Bennett

(74) *Attorney, Agent, or Firm* — Reinhart Boerner Van Deuren s.c.

(57) ABSTRACT

Various laser level designs are shown. In one example, a laser level includes a rotating laser projection assembly to allow users to adjust the placement of the discontinuity in the projected laser plane. In another example, the laser level includes a lanyard attachment robust enough to support the weight of the laser level. The lanyard attachment includes a plurality of prongs that enhance the coupling to the housing of the device.

20 Claims, 10 Drawing Sheets

(56) References Cited

U.S. PATENT DOCUMENTS

| | | | |
|---|---|---|---|
| 8,269,984 B2* | 9/2012 | Hinderling | G01S 17/14 |
| | | | 356/5.1 |
| 8,307,562 B2 | 11/2012 | Bascom et al. | |
| 8,640,350 B2 | 2/2014 | Bascom et al. | |
| 9,074,875 B2 | 7/2015 | Hunze | |
| 9,303,990 B2 | 4/2016 | Bascom et al. | |
| 9,562,766 B2 | 2/2017 | Bascom et al. | |
| 9,702,739 B2 | 7/2017 | Lukic et al. | |
| 10,066,939 B2* | 9/2018 | Lee | G01C 15/004 |
| 10,119,817 B2* | 11/2018 | Spaulding | G01C 15/002 |
| 10,321,596 B2* | 6/2019 | Oguchi | H05K 5/0247 |
| 10,466,049 B2 | 11/2019 | Lee et al. | |
| 10,942,068 B2* | 3/2021 | Lukic | G01K 15/005 |
| 2001/0038447 A1 | 11/2001 | Detweiler et al. | |
| 2005/0198845 A1* | 9/2005 | Robinson | G01C 15/004 |
| | | | 33/227 |
| 2010/0039712 A1 | 2/2010 | Litvin et al. | |
| 2017/0268911 A1 | 9/2017 | Lukic et al. | |
| 2018/0356223 A1 | 12/2018 | Lukic et al. | |
| 2019/0162535 A1 | 5/2019 | Zhuang et al. | |
| 2022/0316879 A1* | 10/2022 | Winkler | G01C 15/004 |
| 2023/0119676 A1* | 4/2023 | Roudebush | G01C 15/105 |
| | | | 33/228 |
| 2023/0384094 A1* | 11/2023 | Winkler | G01C 15/006 |

FOREIGN PATENT DOCUMENTS

| | | |
|---|---|---|
| CN | 111536958 | 8/2020 |
| CN | 211696387 | 10/2020 |
| DE | 19757461 | 6/1999 |
| EP | 1916500 B1 | 12/2010 |
| EP | 2938962 | 3/2018 |

* cited by examiner

LASER LEVEL

CROSS-REFERENCE TO RELATED PATENT APPLICATION

The present application is a continuation of International Patent Application No. PCT/US2022/017151, filed on Feb. 21, 2022 which claims the benefit of and priority to U.S. Provisional Application No. 63/171,211, filed on Apr. 6, 2021, and to U.S. Provisional Application No. 63/152,073, filed on Feb. 22, 2021, which are incorporated herein by reference in their entireties.

BACKGROUND OF THE INVENTION

The present invention relates generally to the field of tools. The present invention relates specifically to a laser projection device, such as a planar laser level, a rotary laser level, a point laser level, etc., that projects one or more lasers onto a work piece or work surface.

SUMMARY OF THE INVENTION

One embodiment of the invention relates to a laser level including a housing, a laser generator positioned within the housing and emitting a laser projection, and a rotating laser projection assembly. The rotating laser projection assembly includes a base and a cage rigidly coupled to the base. The base is rotatably coupled to the housing such that the cage is rotatable about a first axis. The cage includes a plurality of legs and a plurality of windows at least partially defined by the plurality of legs. The laser projection is projected through at least one of the plurality of windows. The cage is rotatable about the first axis between a first position in which one of the plurality of legs creates a first discontinuity in the laser projection and a second position in which the one of the plurality of legs creates a second discontinuity in the laser projection such that a location of the first discontinuity is different than a location of the second discontinuity.

Another embodiment of the invention relates to a laser generating device including a housing with an upward facing surface, a vertical axis, and a laser generator positioned within the housing and emitting a laser projection. The laser generating device further includes a rotating laser projection assembly coupled to the housing along the upward facing surface. The rotating laser projection assembly includes a base and a cage rigidly coupled to the base. The base is rotatably coupled to the housing such that the cage is rotatable about the vertical axis. The cage includes four legs and four windows at least partially defined by the four legs. The base is rotatable relative to the upward facing surface of the housing about the vertical axis.

Another embodiment of the invention relates to a laser level including a housing with an upward facing, generally horizontal surface, a first axis, and a laser generating device positioned within the housing and emitting a laser projection plane. The laser level further includes a rotating laser projection assembly coupled to the housing along the upward facing, generally horizontal surface. The rotating laser projection assembly includes a base and a cage rigidly coupled to the base, such that cage and base together are rotatable relative to the housing about the first axis. The cage includes a plurality of legs, a plurality of lower segments, an upper wall connected to the plurality of lower segments by the plurality of legs, and a plurality of windows defined by the plurality of legs, the plurality of lower segments and the upper wall. The laser generating device emits a laser projection segment through at least one of the plurality of windows. The cage is rotatable between a first position in which at least one of the plurality of legs creates a discontinuity in the laser projection plane at a first location and a second position in which the laser projection plane is continuous at the first location.

Another embodiment of the invention relates to a laser beam generating device including a housing, a laser generator positioned within the housing, and a rotating laser projection assembly rotatably coupled to the housing along an upward facing, horizontal surface. The rotating laser projection assembly includes a base and a cage rigidly coupled to the base. The base is rotatably coupled to the housing. The cage includes a lower segment, an upper wall, and a plurality of legs that together define a window. The laser generator emits a laser projection through the window that is at least partially blocked by the legs. Rotating the rotating laser projection assembly relative to the housing moves the position of the blocked laser projection on a work surface (e.g., doors, walls, etc.). In a specific embodiment, the laser generator includes a laser diode and an optical system configured to generate a planar laser beam, and in a more specific embodiment, the optical system comprises a cone mirror configured to generate a planar laser beam.

Another embodiment of the invention relates to a method of controlling a laser beam generating device. The method includes positioning a laser beam generating device on a support surface (e.g., floor, suspended from a wall, ceiling, beam, etc. via a mounting bracket) and then orienting the rotating laser projection assembly to create a continuous laser plane onto a work surface (e.g., doors, walls, etc.). The laser beam generating device includes a housing, a laser generator positioned within the housing and a rotating laser projection assembly rotatably coupled to the housing along an upward facing, horizontal surface. The method includes reorienting the rotating laser projection assembly relative to the housing without reorienting the housing to create a continuous laser plane in a predetermined location on the work surface. As a result, work can continue longer distances across a work surface without moving the whole laser beam generating device.

Another embodiment of the invention relates to a laser beam generating device including a housing with opposing side surfaces, generally parallel to a major axis, a laser generator positioned within the housing and a lanyard attachment rigidly coupled to a side surface. The lanyard attachment includes an inner surface that defines an aperture. The aperture provides space for a lanyard or cord to be positioned through the lanyard attachment. The lanyard attachment further includes a plurality of prongs that enhance the coupling to the housing of the device. The lanyard attachment is robust enough to support the weight of the laser beam generating device, allowing the user to place the laser beam generating device in numerous arrangements without damaging the tool or endangering the safety of the user.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of laser projection devices, are shown. As discussed herein, Applicant has developed a number of improvements to the functionality and/or control of laser levels, and specifically to a planar laser level. To protect one or more component of a laser level optical system, the laser level includes a frame or cage surrounding windows through which the projected laser is transmitted. However, particularly in the context of a laser level that projects a line or plane, a laser discontinuity is formed because the structure of the cage blocks a portion of the laser and this discontinuity is then visible on the work piece or work surface.

In various embodiments, to improve the usability of such a laser despite the projection of this laser discontinuity, the laser level designs discussed herein include a rotating laser projection assembly. When the user rotates the laser projection assembly, the laser discontinuity on a work piece or work surface is shifted without moving the laser level as a whole. Therefore, a user can more efficiently and accurately complete their project with a continuously projected laser plane in the desired location.

In another embodiment, the laser level includes a lanyard attachment robust enough to support the laser level. The lanyard attachment allows the user to place the laser level in numerous arrangements without damaging the device. A lanyard may be coupled to the lanyard attachment preventing the tool from shifting further than a distance provided by the lanyard. This prevents a safety hazard to the user and also protects the tool from the damage that may be otherwise caused by a fall. The lanyard attachment is formed from a material with a high strength to weight ratio and designed to include a plurality of attachment points that couple to the housing.

Figure 1:
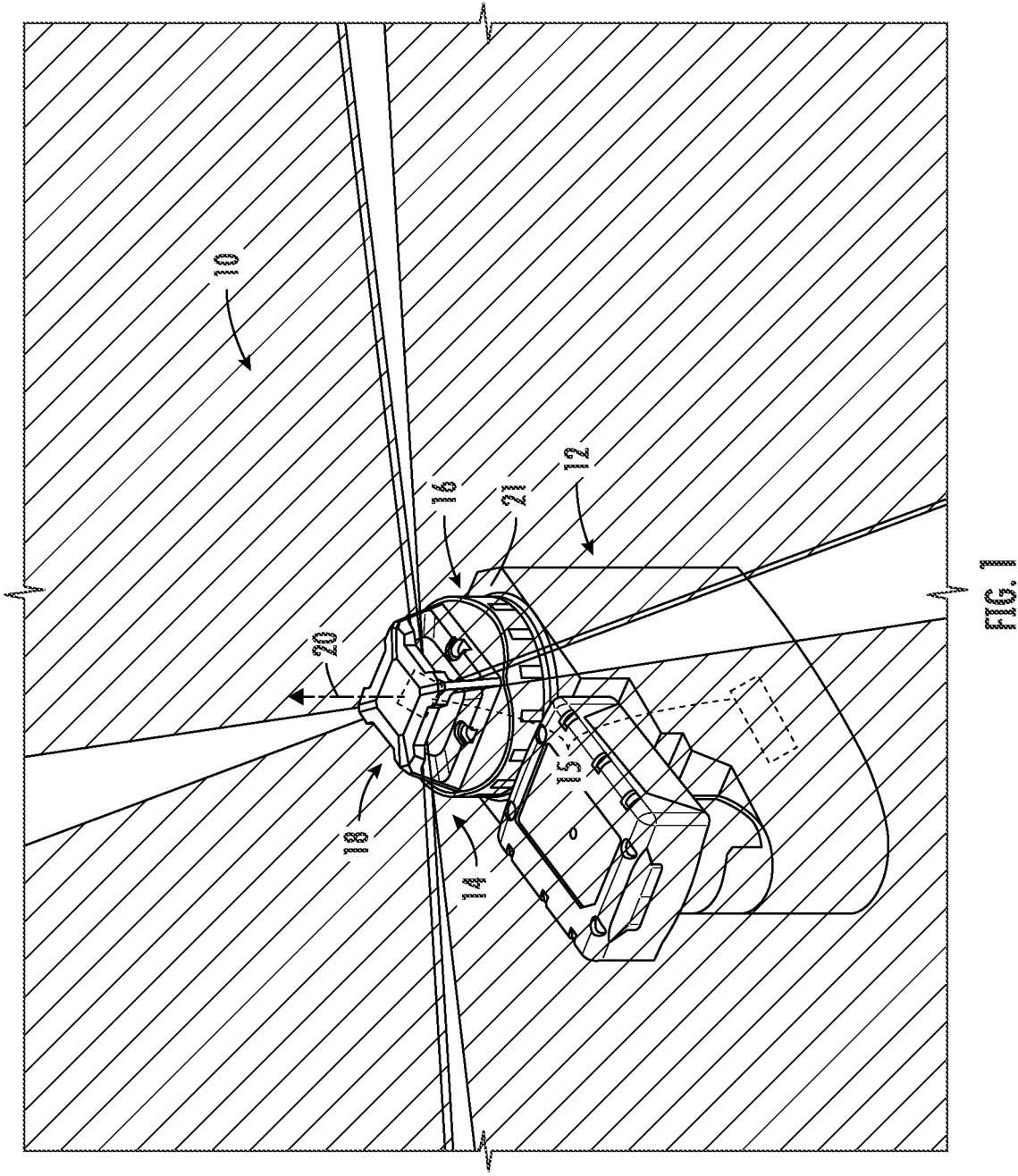
FIG. 1 is a perspective view of a laser level showing a laser projection assembly in a first position, according to an exemplary embodiment.
Figure 2:
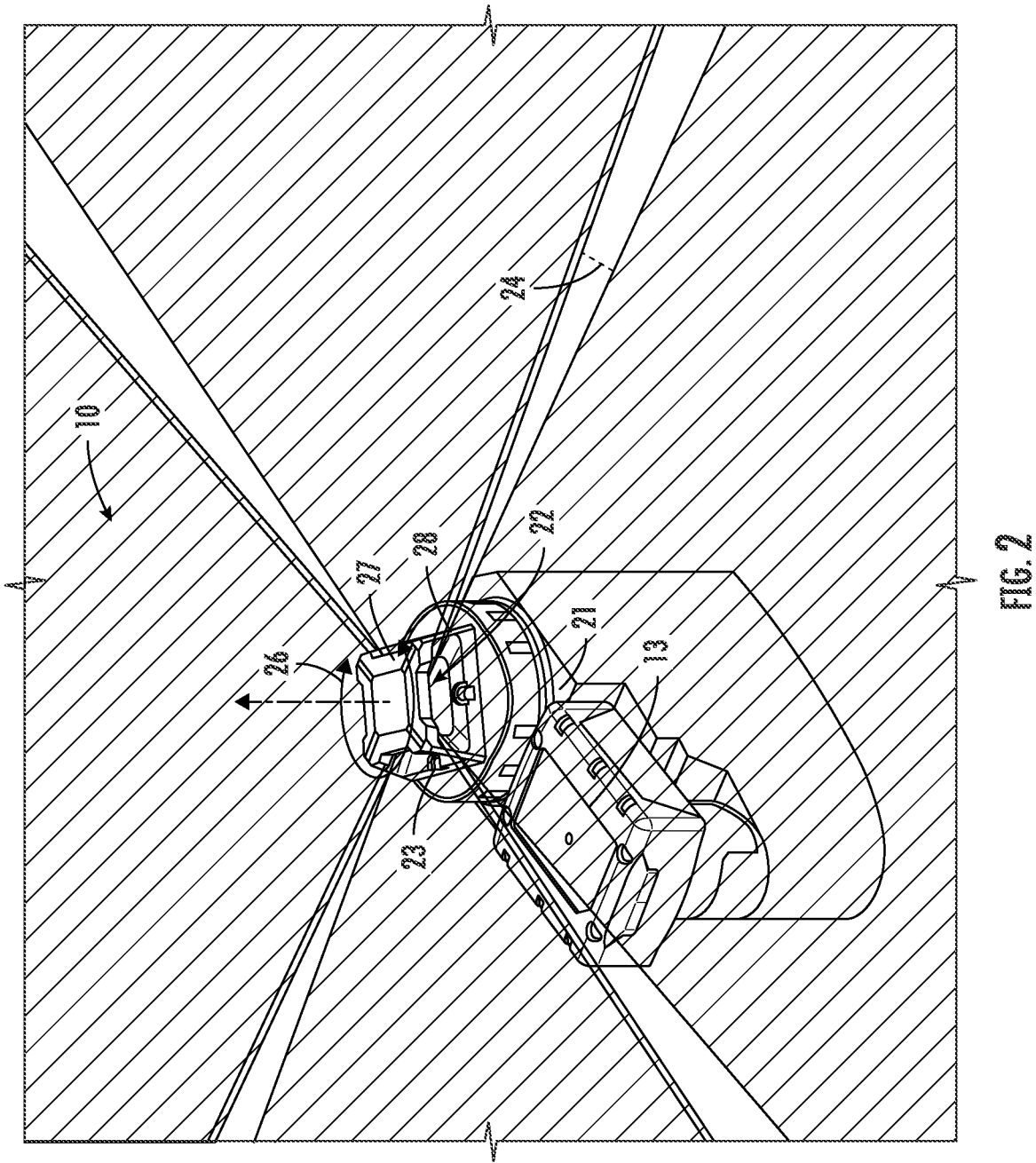
FIG. 2 is a perspective view of the laser level of FIG. 1 after rotation of the laser projection assembly to a second position, according to an exemplary embodiment.
Figure 3:
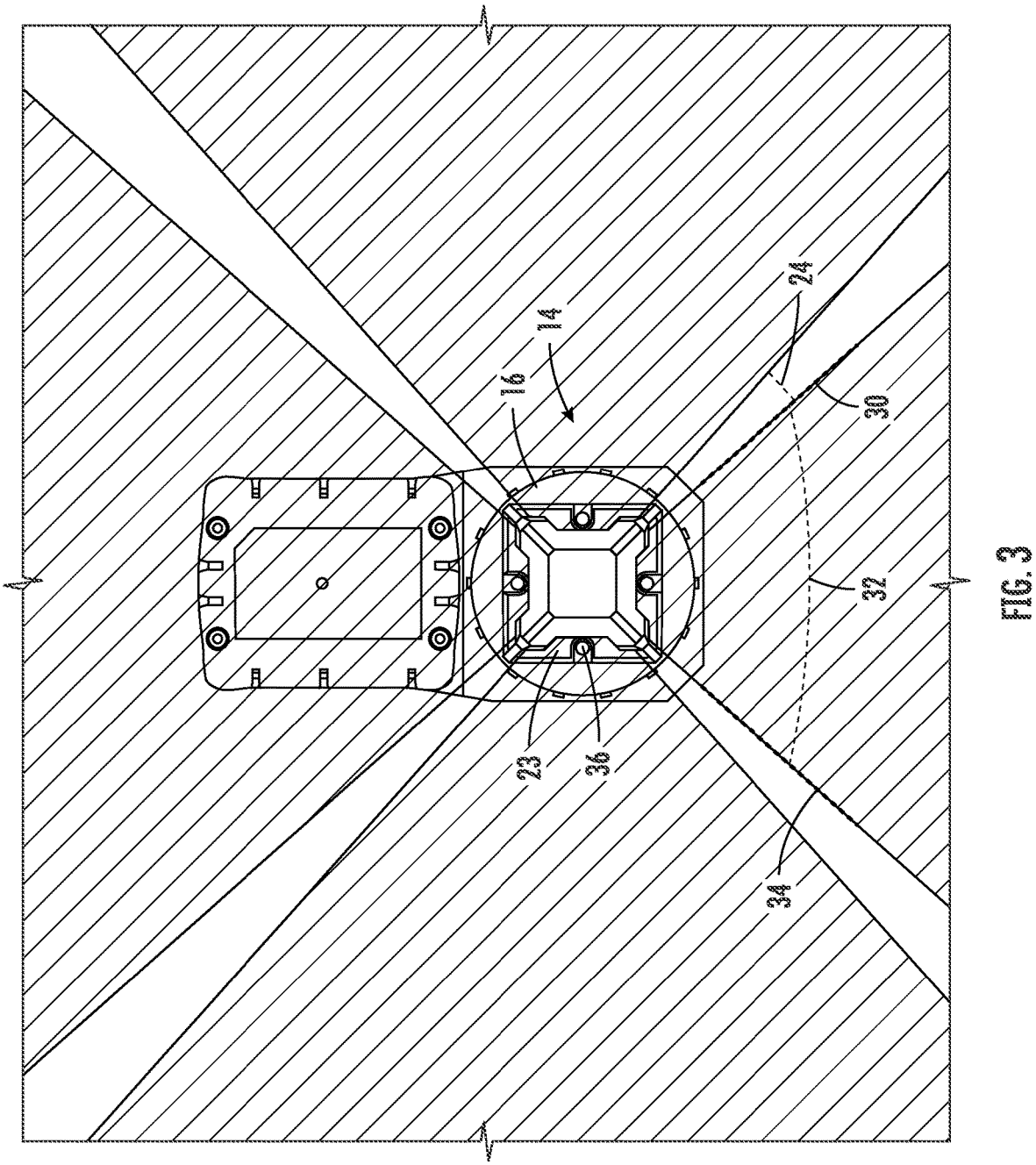
FIG. 3 is a top view of the laser level of FIG. 1, according to an exemplary embodiment.

Referring to FIGS. 1-3, various aspects of a laser beam generating device, shown as a laser level 10, are shown. Laser level 10 includes a housing 12, power supply, shown as a power tool battery 13, a rotating laser projection assembly 14 and a laser generator 15 positioned within housing 12 and/or within rotating laser projection assembly 14. In general, laser generator 15 includes various components for generating the laser line or laser plane associated with laser level 10, including one or more laser emitting device (e.g. a laser diode etc.), various optical components (e.g., lens, collimators, mirrors, beam shapers, etc.) and supporting hardware (e.g. leveling pendulum, position sensors, electronic controllers, etc.).

Rotating laser projection assembly 14 includes a base 16 and a cage 18. In general, rotating laser projection assembly 14 is rotatably coupled to housing 12 such that is rotatable about a first axis shown as central axis 20, in a direction represented by arrow 26. Housing 12 includes an upward facing, generally horizontal surface 21 (e.g., generally perpendicular to central axis 20 or 90°±10°), and rotating laser projection assembly 14 is rotatably coupled to housing 12 along generally horizontal surface 21 such that rotating laser projection assembly 14 and specifically base 16 and cage 18 are rotatable about the first axis 20 which is a vertical axis. In general, rotating laser projection assembly 14 is rotatable about the first axis (e.g., first axis is an axis of rotation) relative to generally horizontal surface 21 to provide for user selected projection of laser plane as will be discussed in more detail below. It should be understood that the rotating laser projection assembly could similarly be coupled to a side surface of the housing, projecting a vertical laser plane on the work surface.

Referring to FIG. 2, cage 18 includes a lower segment 23, an upper wall 27, and a plurality of legs 28 to define a plurality of windows 22. Each window 22 is at least partially defined by the plurality of legs 28. In a specific embodiment, cage 18 includes four legs 28 and four windows 22. In another embodiment, cage 18 may include a different number of legs and windows (e.g., 8 legs and 8 windows, etc.). Each leg 28 blocks projection of a portion of the laser projection or plane, defining a laser discontinuity 24. The laser projection is projected though at least one of the plurality of windows.

The rotational movement 26 about axis 20 shown from FIG. 1 to FIG. 2 demonstrates the laser discontinuity 24 is not at a fixed position relative to the rest of housing 12 or to the related work surface/work piece, allowing the user to reposition laser projection assembly 14 as needed (e.g., so that the projected laser continuity does not interfere with viewing of the projected laser line on the work surface). For example, cage 18 is rotatable about the first axis 20 between a first position in which one of the plurality of legs 28 creates a first discontinuity in the laser projection and a second position, in which the one of the plurality of legs creates a second discontinuity in the laser projection such that a location of the first discontinuity is different than a location of the second discontinuity. Cage 18 is rigidly coupled to base 16 via a plurality of fasteners 36 connected at the lower segments 23. In other embodiments, cage 18 includes a windowpane defined by window 22 with additional sealing features.

Referring to FIG. 3, in the specific embodiment shown, laser level 10 and more specifically laser generator 15 emits a segment 32 of the continuous laser plane through each window 22. Segment 32 is defined by a first edge 30 of the laser plane segment and a second edge 34 of the laser plane segment. Legs 28 block projection of a portion of the continuous laser plane further defining first and second edges of segments 32 and also defining laser discontinuities 24.

Figure 4:
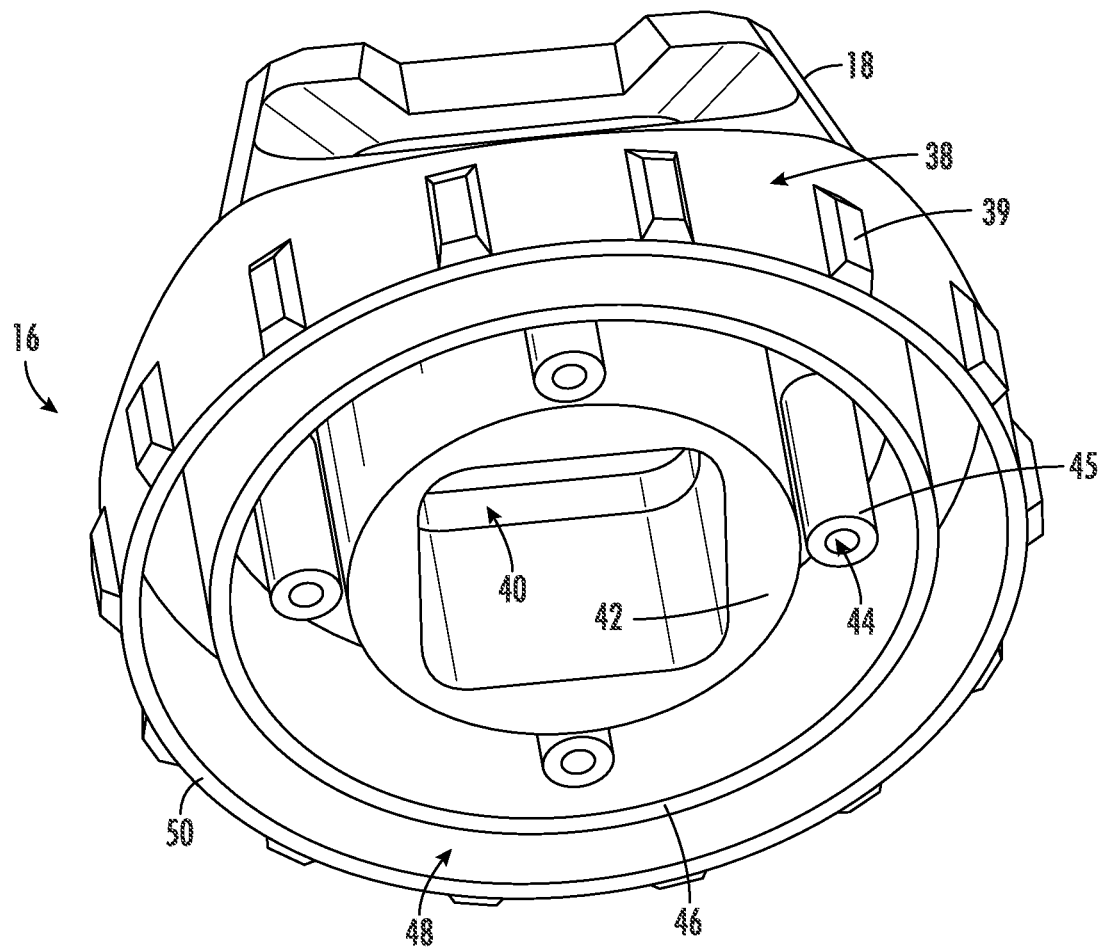
FIG. 4 is a detailed perspective view of the base of the rotating laser projection assembly of FIG. 1, according to an exemplary embodiment.

In general and as noted above, cage 18 is rigidly (i.e., non-rotationally) coupled to an upper surface of base 16, such that cage 18 and base 16 rotate together relative to housing 12. Referring to FIGS. 3-4, various aspects of the rigid coupling between the base 16 and cage 18 of the rotating laser projection assembly 14, are shown. Base 16 includes an opening or aperture 40 formed on a cylinder, shown as central cylinder 42. In general, aperture 40 provides the space/area through which one or more component of laser generator 15 passes from housing 12 into a general space located within cage 18. In one specific embodiment in which laser level is a 360 degree planar laser, a cone mirror is located within cage 18 and a laser beam generated by a laser diode within housing 12 is directed through aperture 40 centered on the tip of the cone mirror to generate a projected laser plane. In other embodiments, laser level 10 is a rotary laser in which a rotating mirror or prism is located within cage 18. In other embodiments laser level 10 is a planar laser configured to generate a planar beam having an angular projection of less 360 degrees (e.g., project a fan beam through cage 18).

Base 16 includes a plurality of small diameter projections, shown as narrow cylinders 45. A bore 44 extends through each narrow cylinder 45. Narrow cylinder 45 is positioned between central cylinder 42 and an inner annular base wall 46. Bore 44 of each narrow cylinder 45 receive fasteners 36 that also extend through segment 23, and in this manner, base 16 and cage 18 are rigidly coupled together by coupling of each fastener 36 with the corresponding bores 44 of each narrow cylinders 45. Bores 44 are further used to couple base 16 to housing 12.

Figure 5:
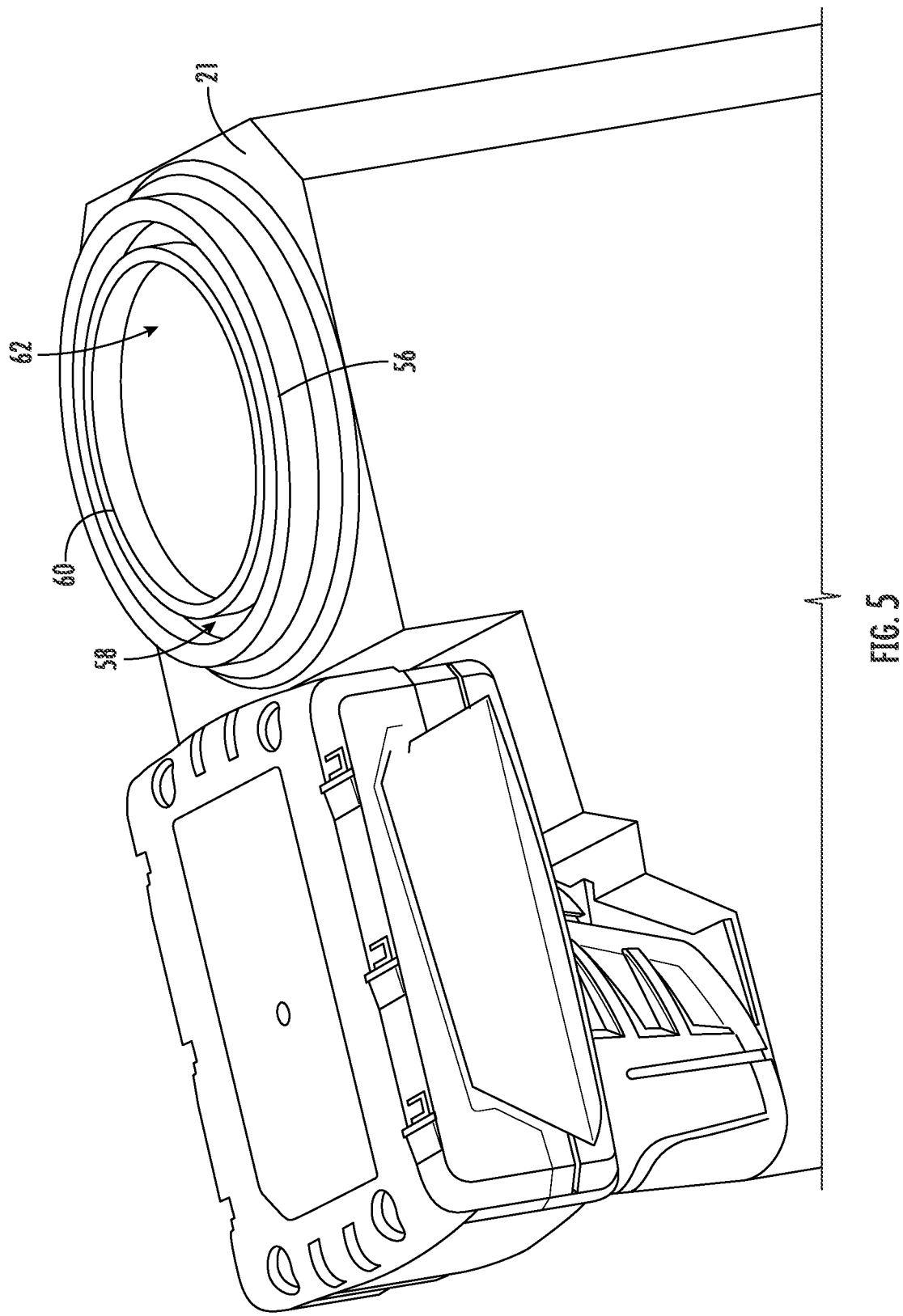
FIG. 5 is a detailed perspective view of the upward facing, horizontal surface of the housing of FIG. 1, according to an exemplary embodiment.

Referring to FIGS. 4-5, various aspects of the rotational coupling between the rotating laser projection assembly 14 and housing 12, are shown. The inner annular base wall 46 and an outer annular base wall 50 define an annular base channel 48. The upward facing, generally horizontal surface 21 of housing 12 includes an outer cooperating annular wall 56 and an inner cooperating annular wall 60 that define annular housing channel 58. Generally horizontal surface 21 further includes a cooperating cavity 62. When base 16 is assembled onto housing 12, annular base channel 48 receives outer cooperating annular wall 56 and annular housing channel 58 receives inner annular base wall 46 defining the rotating joint. Cooperating cavity 62 receives central cylinder 42 and narrow cylinders 45. The generally circular shape of these components form a rotational joint or coupling such that a user can spin base 16 as desired relative to housing 12. In other embodiments, the rotational joint may further include components such as a gasket to ensure a tight fit between the base and the horizontal surface of the housing.

Referring to FIG. 4, to further facilitate manual rotation of base 16, base 16 includes one or more grip enhancing structures located on an outer sidewall surface 38 of base 16. In the specific embodiment shown, the grip enhancing structures include a plurality of radially extending projections 39 spaced around the perimeter of base 16. In other embodiments, the outer sidewall surface can include other grip enhancing structures such as a textured surface or friction increasing material such as soft touch polymer material.

As mentioned above, rotating laser projection assembly 14 is rotatable relative to generally horizontal surface 21. It may be important to protect the laser generator 15 using a structure like the cage 18. However, the legs 28 create laser discontinuities 24. The exemplary embodiments of the present application allows the user to move the rotating laser projection assembly 14 and therefore to choose the location of the laser discontinuities 24 on the work surfaces (e.g., doors, walls, etc.). When the user reaches the end of segment 32 of the continuous laser plane they can move the rotating laser projection assembly 14 again to keep segment 32 in the required location on the work surface.

Figure 6:
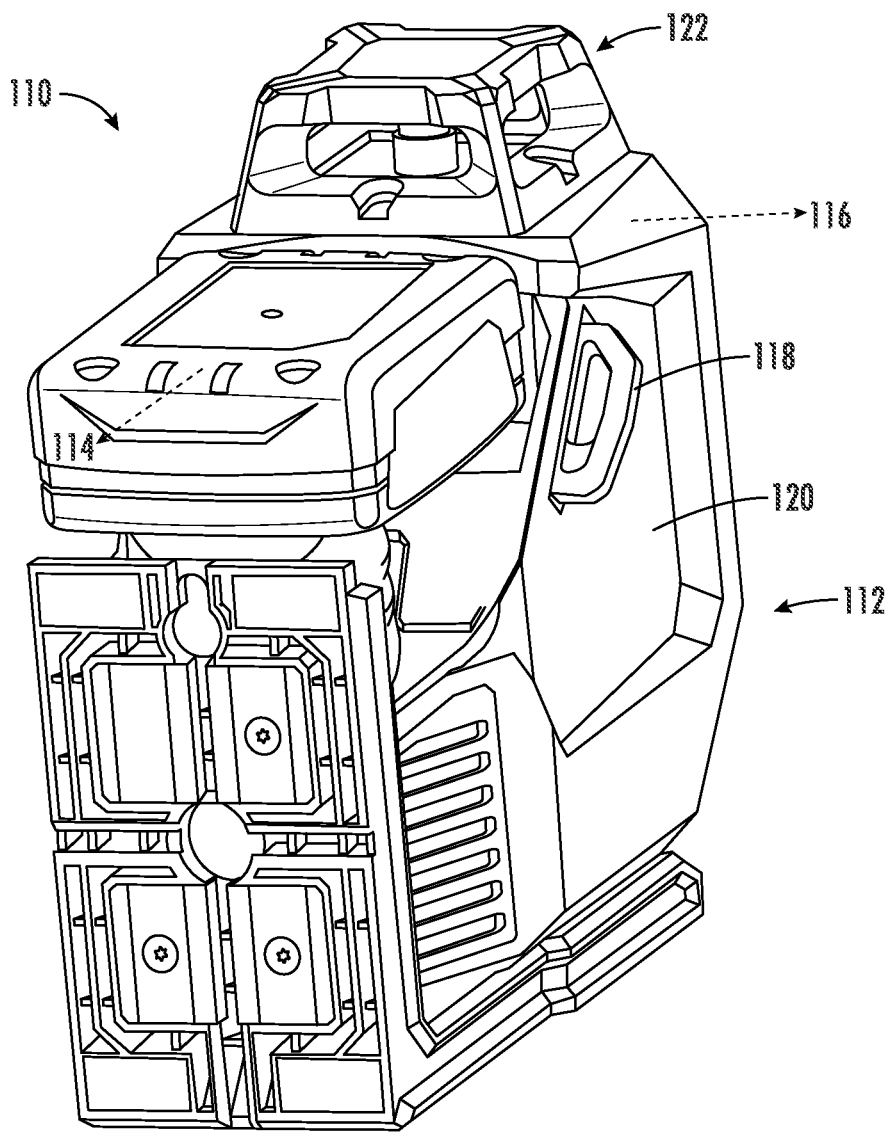
FIG. 6 is a perspective view of a laser level including a lanyard attachment, according to an exemplary embodiment.
Figure 7:
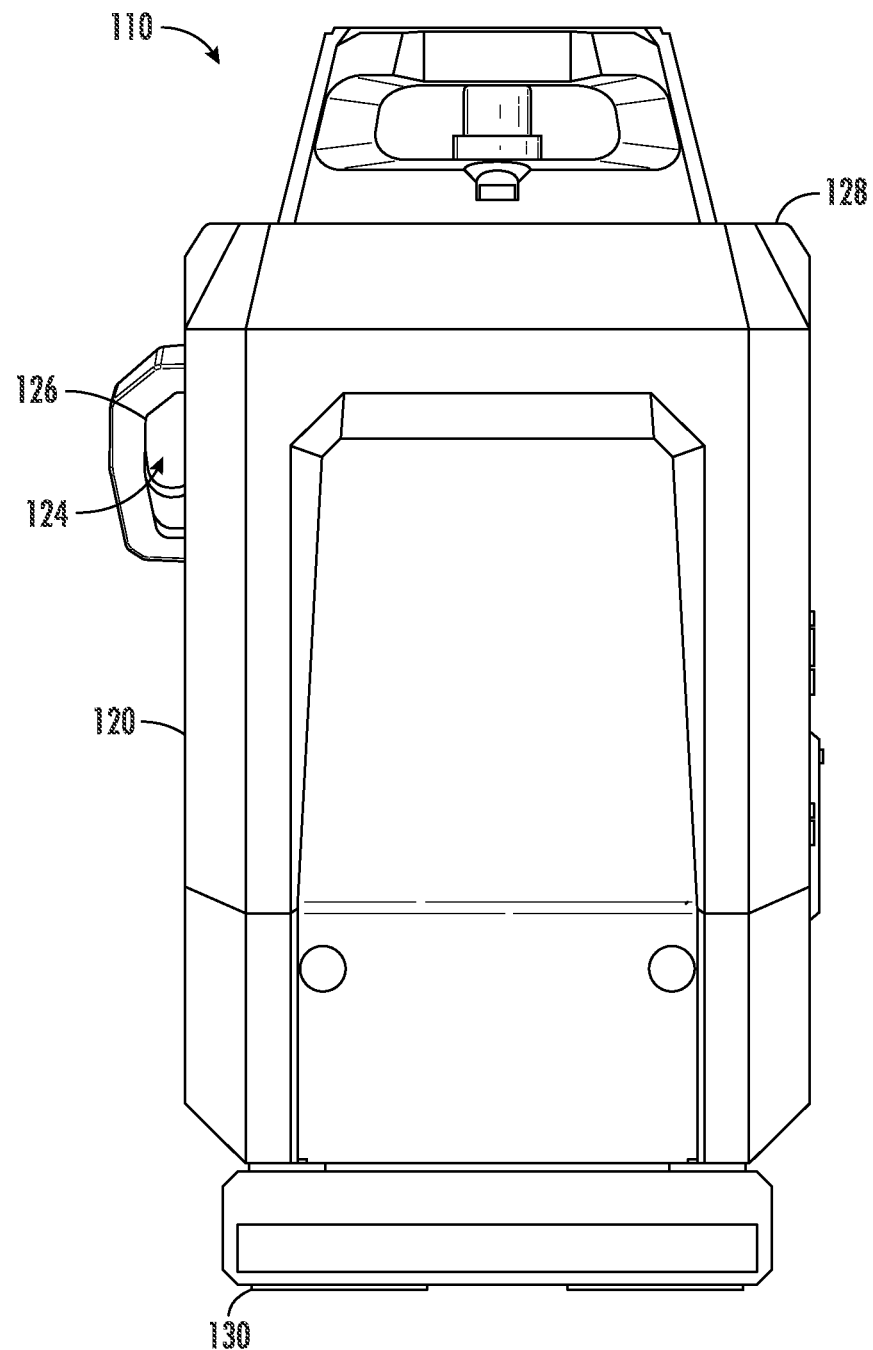
FIG. 7 is a front view of a laser level including a lanyard attachment, according to an exemplary embodiment.

Referring to FIGS. 6-7, various aspects of a laser beam generating device, shown as a laser level 110, are shown. In general, laser level 110 is substantially the same as laser level 10 except for the differences discussed herein. Laser level 110 includes housing 112 with opposing side surfaces 120 generally parallel to a major axis 114. Housing 112 further includes an upward facing, top surface of housing 128 and a bottom surface of housing generally parallel to a minor axis 116. A cage 122 is rigidly coupled to the upward facing, top surface of housing 128.

A lanyard attachment 118 that can be utilized with laser level 110 and/or laser level 10 is shown accordingly to an exemplary embodiment. Lanyard attachment 118 is rigidly coupled to side surface 120. Lanyard attachment 118 is positioned between the upward facing, top surface of housing 128 and the bottom surface of housing 130. Lanyard attachment 118 includes an inner surface 126 that defines a lanyard attachment aperture 124. In general, lanyard attachment 118 is robust enough to support the weight of laser level 110 during drop and supported from a lanyard. While lanyard attachment 118 is shown with a planar laser level without a rotating cage 122, in other embodiments, lanyard attachment 118 may be coupled to a different housing and/or used with a different type of laser projection device (e.g., a rotary laser level, a point laser level, etc.).

Figure 8:
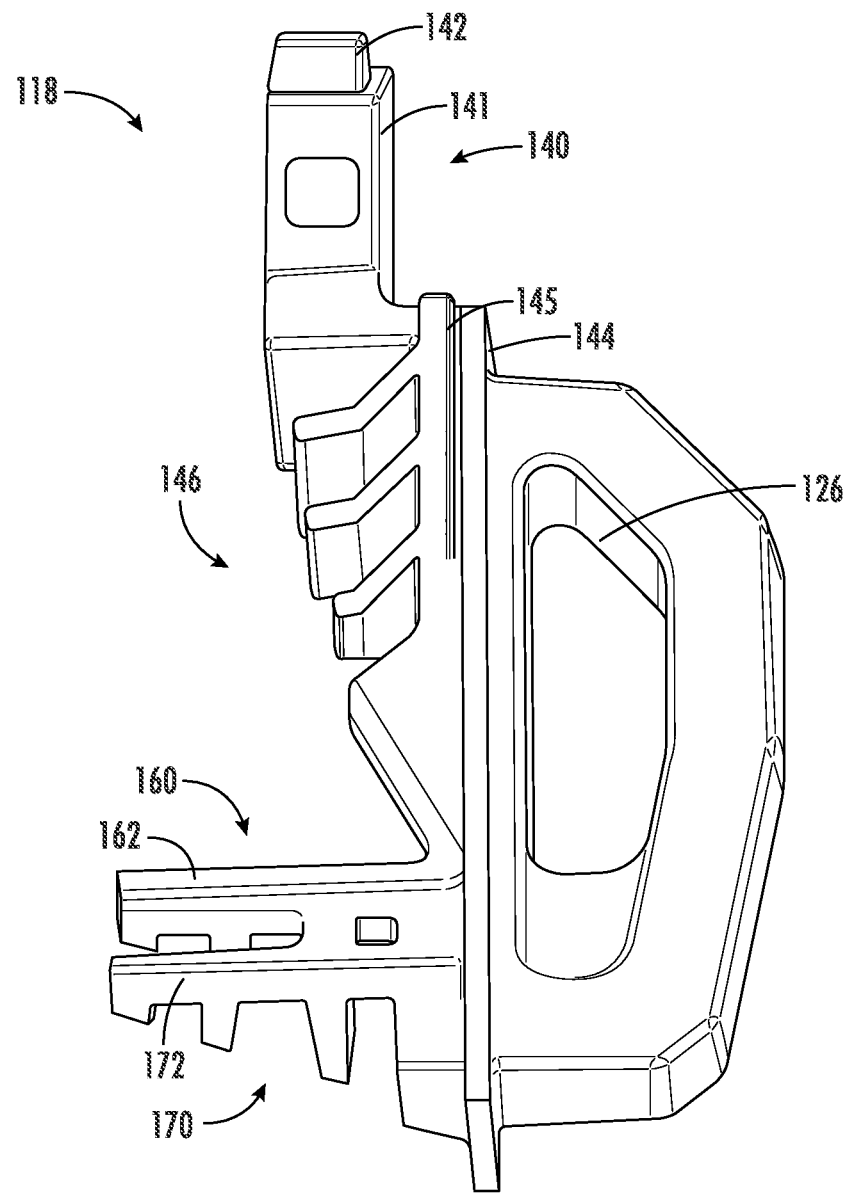
FIG. 8 is a detailed rear perspective view of the lanyard attachment of FIG. 7, according to an exemplary embodiment.
Figure 9:
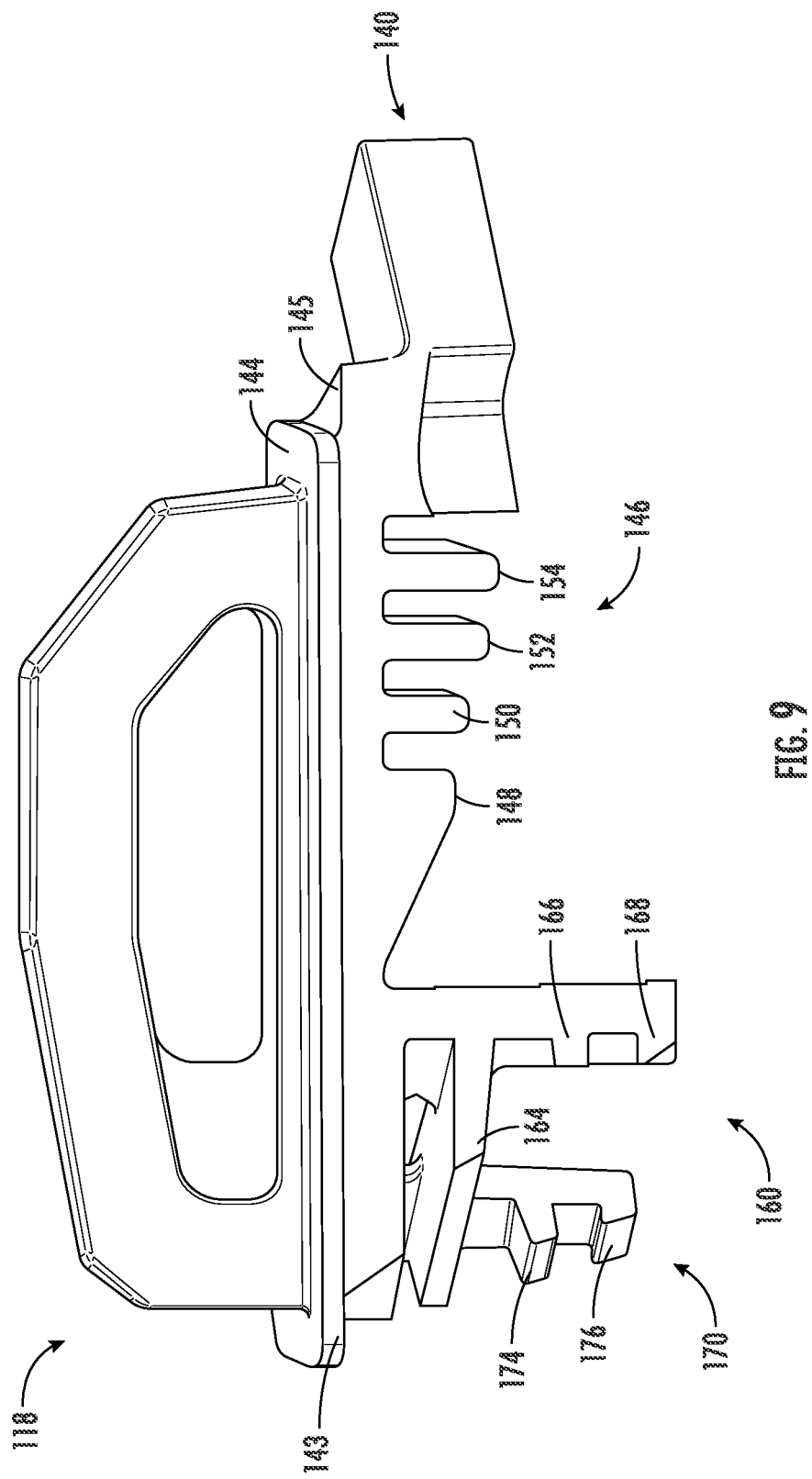
FIG. 9 is another detailed perspective view of the lanyard attachment of FIG. 6, according to an exemplary embodiment.
Figure 10:
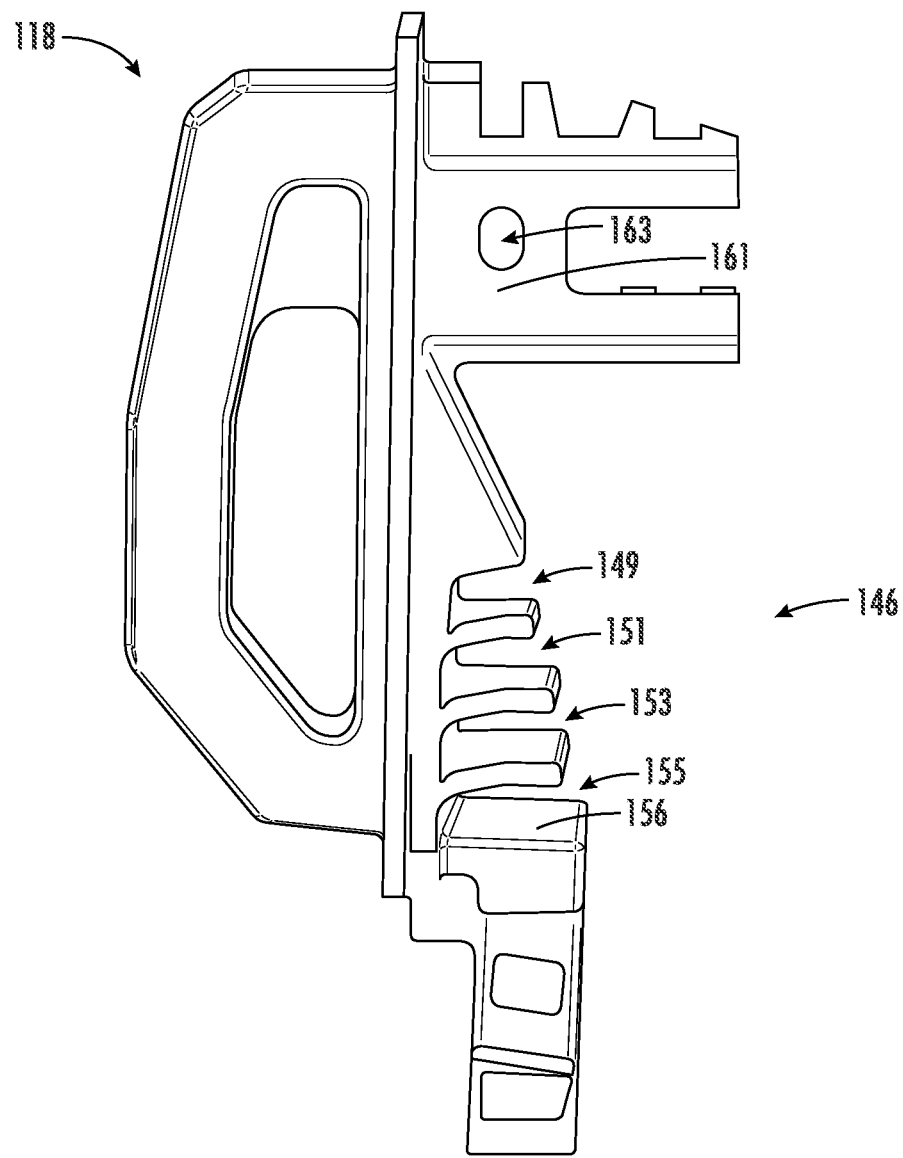
FIG. 10 is another detailed perspective view of the lanyard attachment of FIG. 6, according to an exemplary embodiment.

Referring to FIGS. 8-10, various aspects of the lanyard attachment 118 that allow for rigid coupling to the housing of the laser beam generating device, are shown. Specifically, Applicant has designed a lanyard attachment 118 with a variety of anchoring portions that provide for robust connection to the laser level housing. Lanyard attachment 118 includes an upward prong 140, a triangular prong assembly 146, a first angled prong 160, and a second angled prong 170. Lanyard attachment 118 further includes an outward facing surface 144. Outward facing surface 144 includes an edge 143 along which outward facing surface 144 is coupled to an inner surface 145. Inner surface 145 extends away from outward facing surface 144 into upward prong 140. Upward prong 140 includes a body 141 and a generally trapezoidal shaped projection 142.

Triangular prong assembly 146 includes a generally triangular projection 148, a first narrow projection 150, a second narrow projection 152, and a third narrow projection 154. Generally triangular projection 148 and first narrow projection 150 define a first attachment channel 149. First narrow projection 150 and second narrow projection 152 define a second attachment channel 151. Second narrow projection 152 and third narrow projection 154 define a third attachment channel 153. A bottom surface 156 of upward prong 140 and third narrow projection 154 define a fourth attachment channel 155.

First angled prong 160 includes a segment 162 extending in a generally perpendicular direction from outward facing surface 144. Second angled prong 170 includes a segment 172 extending in a generally perpendicular direction from outward facing surface 144. First angled prong 160 further includes a first anchor 164, a second anchor 166, and a third anchor 168. First anchor 164 extends between and connects segment 162 of first angled prong 160 and segment 172 of second angled prong 170. Second angled prong 170 further includes a second anchor 174, and a third anchor 176. Lanyard attachment 118 further includes a prong surface 161 that extends between segment 162 of first angled prong 160 and segment 172 of second angled prong 170. An aperture 163 is formed on prong surface 161.

The lanyard attachment is formed from a material with a high strength to weight ratio. In a specific embodiment, the lanyard attachment is formed from die cast aluminum.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A laser level comprising:
   a housing;
   a laser generator positioned within the housing and emitting a laser projection; and
   a rotating laser projection assembly coupled to the housing, the rotating laser projection assembly comprising:
      a base; and
      a cage rigidly coupled to the base, wherein the base is rotatably coupled to the housing such that the cage is rotatable about a first axis, the cage comprising:
         a plurality of legs; and
         a plurality of windows at least partially defined by the plurality of legs;
   wherein the laser projection is projected through at least one of the plurality of windows; and
   wherein the cage is rotatable about the first axis between a first position in which one of the plurality of legs creates a first discontinuity in the laser projection and a second position in which the one of the plurality of legs creates a second discontinuity in the laser projection such that a location of the first discontinuity is different than a location of the second discontinuity.

2. The laser level of claim 1, the base further comprising:
   a cylinder and an aperture formed on the cylinder;
   a first annular base wall; and
   a second annular base wall defining an annular base channel with the first annular base wall;
   wherein the first annular base wall is positioned between the cylinder and the second annular base wall.

3. The laser level of claim 2, the housing further comprising:
   a cooperating cavity;
   a first cooperating annular wall; and
   a second cooperating annular wall defining an annular housing channel with the first cooperating annular wall;
   wherein the first cooperating annular wall is positioned between the cooperating cavity and the second cooperating annular wall and wherein when the base is coupled to the housing, the annular housing channel is configured to cooperate with at least a portion of the base.

4. The laser level of claim 3, wherein when the base is coupled to the housing, the cooperating cavity receives the cylinder of the base, the annular base channel receives the second cooperating annular wall and the annular housing channel receives the first annular base wall defining a rotating joint.

5. The laser level of claim 1, the base further comprising an outer sidewall surface, wherein the outer sidewall surface includes one or more grip enhancing structures such that a user can manually rotate the base.

6. The laser level of claim 1, the housing further including a pair of opposing side surfaces, wherein a lanyard attachment is rigidly coupled to at least one of the pair of opposing side surfaces.

7. The laser level of claim 6, the lanyard attachment including an inner surface defining an attachment aperture, the attachment aperture sized such that a lanyard can extend through the attachment aperture.

8. The laser level of claim 7, the lanyard attachment further including a plurality of anchoring portions such that the lanyard attachment can support a weight of the laser level.

9. The laser level of claim 1, wherein the laser projection is a laser plane.

10. A laser generating device comprising:
a housing including an upward facing surface;
a vertical axis;
a laser generator positioned within the housing and emitting a laser projection; and
a rotating laser projection assembly coupled to the housing along the upward facing surface, the rotating laser projection assembly comprising:
a base; and
a cage rigidly coupled to the base, wherein the base is rotatably coupled to the housing such that the cage is rotatable about the vertical axis, the cage comprising:
four legs; and
four windows at least partially defined by the four legs;
wherein the base is rotatable relative to the upward facing surface of the housing about the vertical axis.

11. The laser generating device of claim 10, wherein the laser generator projects the laser projection through one of the windows and wherein the cage is rotatable between a first position in which one of the four legs creates a first discontinuity in the laser projection and a second position in which the one of the four legs creates a second discontinuity in the laser projection such that a location of the first discontinuity is different than a location of the second discontinuity.

12. The laser generating device of claim 10, the base further comprising:
a cylinder and an aperture formed on and extending through the cylinder;
an inner annular base wall; and
an outer annular base wall defining an annular base channel with the inner annular base wall;
wherein the inner annular base wall is positioned between the cylinder and outer annular base wall.

13. The laser generating device of claim 12, the upward facing surface of the housing further comprising:
a cooperating cavity;
an inner cooperating annular wall; and
an outer cooperating annular wall defining an annular housing channel with the inner cooperating annular wall;
wherein the inner cooperating annular wall is positioned between the cooperating cavity and the outer cooperating annular wall; and
wherein when the base is coupled to the upward facing surface of the housing, the cooperating cavity receives the cylinder of the base, the annular base channel receives the outer cooperating annular wall and the annular housing channel receives the inner annular base wall defining a rotating joint.

14. The laser generating device of claim 10, the housing further including a pair of opposing side surfaces, the pair of opposing side surfaces positioned in a generally perpendicular orientation to the upward facing surface of the housing, wherein a lanyard attachment is rigidly coupled to at least one of the pair of opposing side surfaces.

15. The laser generating device of claim 14, the lanyard attachment including:
an inner surface defining an attachment aperture; and
a plurality of anchoring portions such that the lanyard attachment can support a weight of the laser generating device when a lanyard is extended through and coupled to the attachment aperture of the lanyard attachment.

16. A laser level comprising:
a housing including an upward facing, generally horizontal surface;
a first axis;
a laser generating device positioned within the housing and emitting a laser projection plane; and
a rotating laser projection assembly coupled to the housing along the upward facing, generally horizontal surface, the rotating laser projection assembly comprising:
a base; and
a cage rigidly coupled to the base such that the cage and base together are rotatable relative to the housing about the first axis, the cage comprising:
a plurality of legs;
a plurality of lower segments;
an upper wall connected to the plurality of lower segments by the plurality of legs; and
a plurality of windows defined by the plurality of legs, the plurality of lower segments and the upper wall;
wherein the laser generating device emits a laser projection segment which is projected through at least one of the plurality of windows; and
wherein the cage is rotatable between a first position in which at least one of the plurality of legs creates a discontinuity in the laser projection plane at a first location and a second position in which the laser projection plane is continuous at the first location.

17. The laser level of claim 16, wherein the laser projection plane includes a plurality of laser projection segments.

18. The laser level of claim 16, wherein a first leg blocks a portion of the laser projection plane defining a first edge of the laser projection segment and a second leg adjacent to the first leg blocks a portion of the laser projection plane defining a second edge of the laser projection segment.

19. The laser level of claim 16, the base further comprising:
a first annular base wall; and
a second annular base wall defining an annular base channel with the first annular base wall.

20. The laser level of claim 19, the upward facing, generally horizontal surface further comprising:
a first cooperating annular wall; and
a second cooperating annular wall defining an annular housing channel with the first cooperating annular wall;
wherein when the base is coupled to the upward facing, generally horizontal surface of the housing, the annular base channel receives the second cooperating annular wall and the annular housing channel receives the first annular base wall defining a rotating joint.

* * * * *